UNITED STATES PATENT OFFICE.

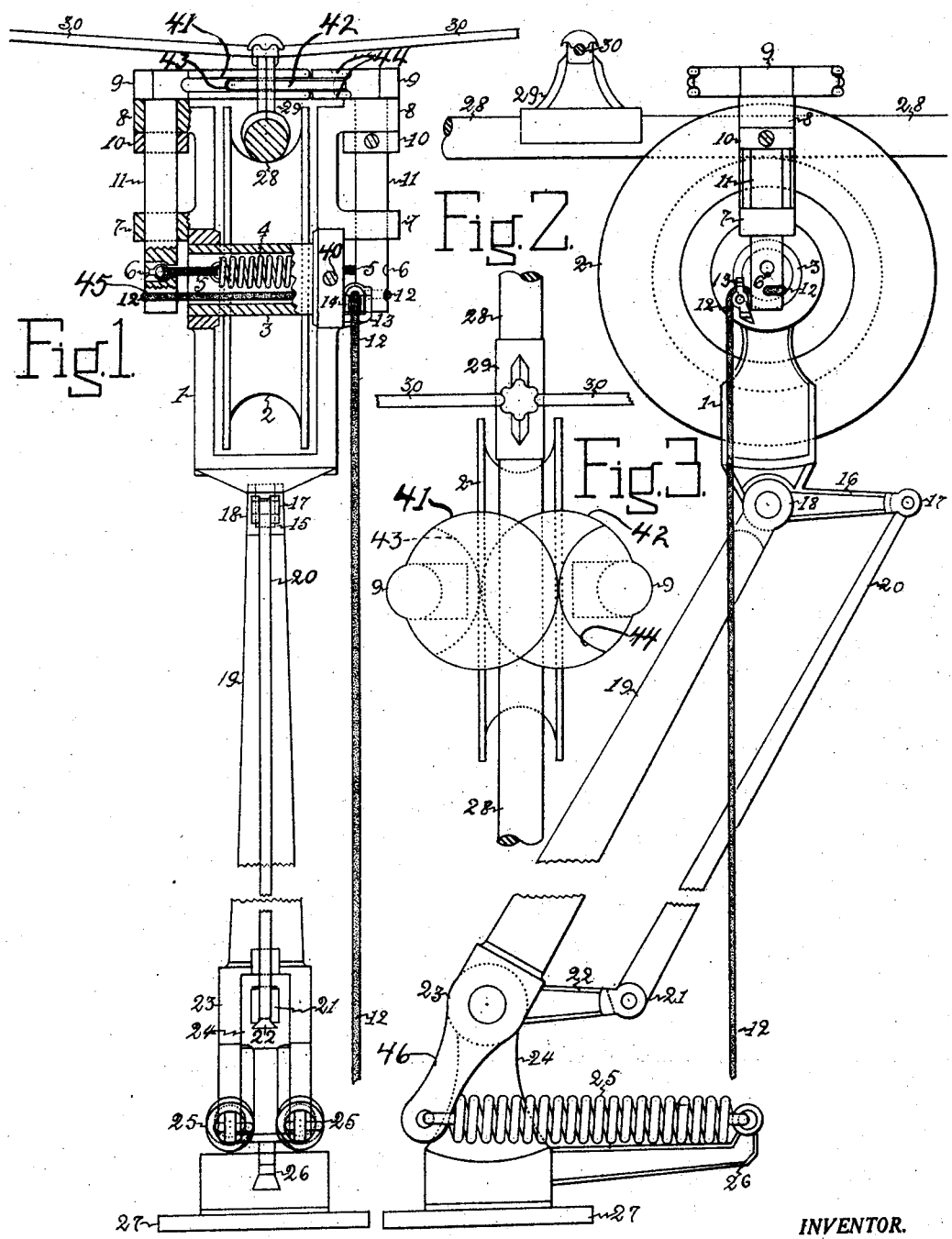

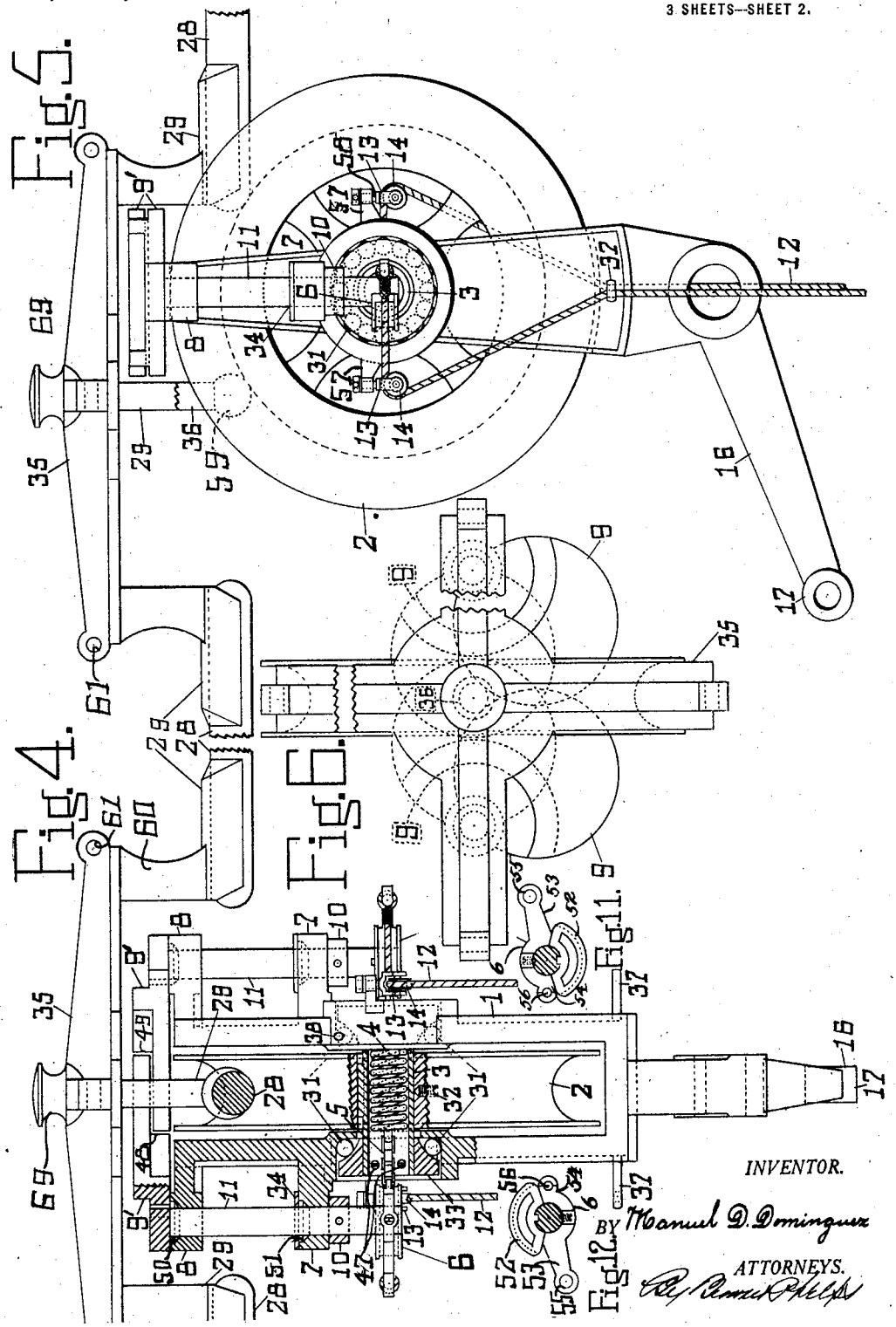

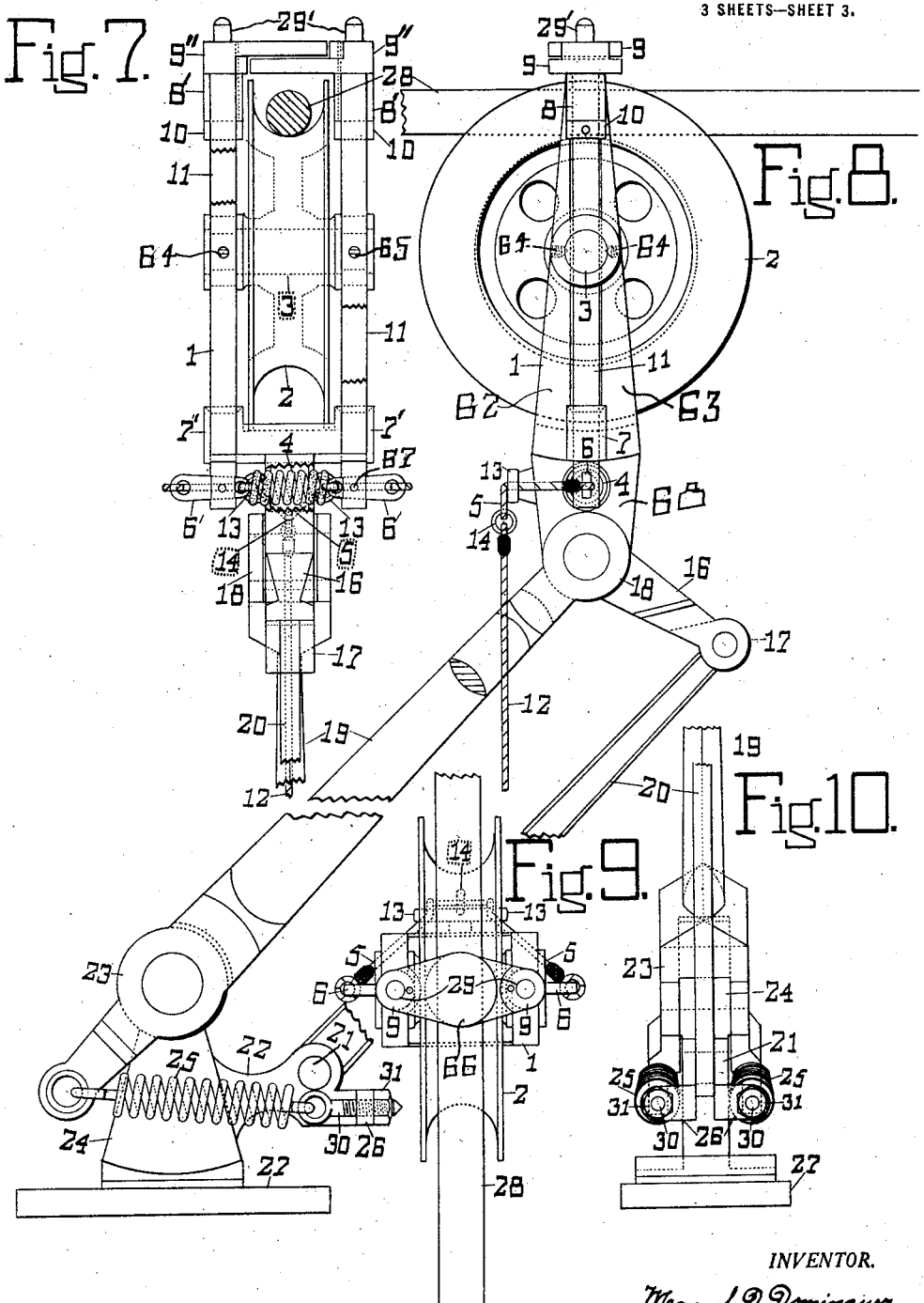

MANUEL D. DOMINGUEZ, OF NEW ORLEANS, LOUISIANA.

TROLLEY.

1,392,560.  Specification of Letters Patent.  Patented Oct. 4, 1921.

Application filed February 10, 1921. Serial No. 444,021.

*To all whom it may concern:*

Be it known that I, MANUEL D. DOMINGUEZ, a subject of the King of Spain, residing at New Orleans, in the county of Orleans and State of Louisiana, have invented certain new and useful Improvements in Trolleys, of which the following is a specification.

This invention relates to trolleys and has as an object the provision of a trolley mounted in a harp of such a nature that the trolley wheel can not leave the wire. A further object of the invention is the provision of means to automatically release the trolley safety means when the trolley is pulled down by the usual rope.

Illustrative embodiments of the invention are shown in the accompanying drawings in which—

Figure 1 is a rear elevation, partly in section, showing the trolley wire in section;

Fig. 2 is a detail plan view of the invention showing a section of trolley wire and a hanger;

Fig. 3 is a side elevation;

Fig. 4 is a detail rear elevation, partly in section, and showing a trolley wire crossover, and a modified form of the invention;

Fig. 5 is a detail side elevation of the form shown in Fig. 4;

Fig. 6 is a detail plan view of what is shown in Fig. 4;

Fig. 7 is a detail rear elevation of a further modification;

Fig. 8 is a side elevation of the modification of Fig. 7;

Fig. 9 is a detail plan view of the showing of Fig. 7;

Fig. 10 is a detail rear elevation of the lower end of a trolley pole and support; and Figs. 11 and 12 are detail plan views of the disk controlling levers.

In the form shown in Fig. 1 the trolley wheel 2 is journaled in the side pieces 1 of the harp upon a hollow shaft 3. The wheel is designed to revolve while the shaft 3 remains stationary, the shaft being held in place by means of the set screw 40. Bearing lugs 7 and 8 are formed integrally with the side pieces 1 and vertical shafts 11 are journaled in these lugs. Rigidly secured upon the upper ends of the shafts 11 are the retaining disks 41, 42, which disks have enlargements 9 where they are secured upon the shafts 11. The disk 41 is bifurcated and the bottom of the recess between the bifurcations is rounded as at 43. Disk 42 has its central portion 43 reduced in thickness, so as to pass between the bifurcations of the disk 41 and the resulting shoulders have their peripheries rounded, as shown at 44. When the shafts 11 revolve the periphery of disks 41 and 42 will remain in close proximity to the rounded shoulders 44 and the rounded bottom 43 of the recess respectively, until turned sufficiently for the shoulders and disks to separate.

To maintain the disks 41 and 42 in the normal position shown in Fig. 3 a spring 4 housed in the hollow shaft 3 is connected to the shafts 11, as by means of plugs 6. When the trolley is to be lowered by means of the rope 12 the disks must be turned out of the way by revolutions of the shafts 11. To cause this movement the rope 12 is laid over a pulley 14, through the shaft 3, about the lower end of one shaft 11, grooved as at 45, for its reception, again through the shaft 3 and about the lower end of the other shaft 11, and secured thereto. The pulley 14 is shown as supported in a bracket 13 carried by the side piece 1.

When during the movement of a car carrying the trolley the disks 41 and 42 come in contact with a hanger, as 29, they will each be turned to the rear until the hanger is passed, when the spring 4 will immediately return them to normal position. The movement to the rear will be only sufficient to pass the hanger 29 and not sufficient to allow the wire to escape should any obstruction tend to throw the trolley downward at this time. Collars 10 are provided on the shafts 11 to prevent their raising out of position.

To preserve the harp in its upright position a parallel motion device is provided in the form of an arm 16, integral with the harp, an arm 22 integral with the trolley support 24, and an arm 20 pivoted at 17 and at 21 to the arm 16 and 22. The trolley pole 19 is pivoted to the harp at 18 and to the support 24 at 23 and is pressed upwardly by springs 25 secured to the extension 46 of the trolley pole 19 and to the arm 26 integral with support 24.

When the trolley rope 12 is pulled upon, disk 41 will be revolved forwardly and disk 42 revolved rearwardly, resulting in a separation of the disks sufficient to allow the trolley to be pulled down.

In the form of the device shown in Figs. 4, 5 and 6 the side pieces 1 have the wheel 2 borne by hollow shaft 3 mounted in ball bearings 31, the cone 33 for which is secured to the shaft by screws 47 and the cups for which are formed integral with the side pieces 1.

In this from of the device, as in that of Figs. 1, 2 and 3, the shafts 11 are journaled in bearing lugs 7 and 8 carried by the side pieces 1. The disks 9 are reduced in thickness at their outer edges in reverse relation so as to overlap, the resulting shoulders 48, 49 being rounded in the same manner as already described in shoulders 44 and recess 43. Lubricant receiving recesses 50 and 51 are shown in the upper surfaces of the bearing lugs 7 and 8 and a cover plate 34 is provided to prevent the escape of lubricant from recesses 51. A collar 10 is shown secured to each of shafts 11 below bearing lugs 7 to prevent upward movement of the shafts.

Rigidly secured upon the lower ends of shafts 11 are the members 6 each bearing a segmental sheave 52, and levers 53 and 54, having eyes 55 and 56 at their ends. A spiral spring 4 housed in the hollow shaft 3 is secured to the eyes 56 as by means of chains 5. The spring being under tension will tend to hold the disks 9' in the position shown in the drawings.

The upper portion of the trolley rope 12 in Figs. 4, 5 and 6 is shown double, and is passed through eyes 37 carried by the lower ends of the side pieces 1, then through pulleys 14 mounted upon arms 57 projecting from the side pieces 1, about the sheaves 52, and have their ends secured to eyes 55. The pulleys 14 are preferably mounted in a bifurcated fitting 13, each mounted upon a pivot pin 58, so as to be revoluble to follow the motion of the ends of the levers 53. The action of disk 9' upon meeting an obstruction, such as a hanger, will be the same as that of disks 41 and 42, and when the trolley rope 12 is pulled upon the shaft 11 will be revolved against the action of spring 4 in the same manner as already described in connection with the form of Figs. 1, 2 and 3.

A special form of cross over is shown for the trolley wire in Figs. 4, 5 and 6, comprising a cross 35 having four arms of equal length with the wire holder 29 secured upon downwardly projecting member 60 formed upon the end of each arm. An eye 61 may be provided for the attachment of guys. At the intersection of the arms of the cross 35 there is shown a button 69 for the attachment of a feed wire. Projecting downwardly from the center of the intersection of the cross is a pin 36 having a rounded enlargement 59 upon its lower end for the purpose of preventing the upward movement of the trolley at the intersection, which movement would bring the disks 9' into contact with the member 35, and which contact might by friction swing the disks 9' to the rear and allow the trolley to escape from the wire.

The form of the invention shown in Figs. 7 to 10 inclusive is designed to be sufficiently small in lateral dimensions to be used with an ordinary form of cross-over, thus avoiding the necessity for the special form of cross-over shown in Figs. 4, 5 and 6. In this form of the invention the side pieces 1 are formed with two members 62, 63. The shaft 3 upon which the trolley wheel 2 is journaled is stationary and is rigidly secured to the members 62 and 63 by means of set screws 64 and 65. The ends of the shaft 3 are perforated between the members 62 and 63 and the vertical shafts 11 are passed through these perforations and are journaled in blocks 7' and 8' rigidly secured to or formed integrally with the members 62, 63. The collars 10 are provided upon the shafts 11 to prevent their undue upward motion. The upper portion of shafts 11 are reduced in size and allowed to project above disks 9'' as at 29', for a purpose to be explained. The disks 9'' are reversely reduced in size, so as to overlap in the same manner as already described for disk 9' and are preferably made in the form shown in plan in Fig. 9 with enlarged ends 66 in the portion where they overlap. When the trolley provided by this form of the invention passes the usual form of cross-over the projecting portions 29' of the shafts 11 will impinge upon the smooth surface provided by these cross-overs, and will prevent the disks 9'' from coming in contact therewith. To hold the shafts 11 in their normal positions levers 6' are passed through openings in their lower ends and secured therein by means of pins 67. The inwardly projecting ends of the levers 6' are secured to the spring 4 passed through an opening in the member 68 of the harp, and by its tension tends to hold the shafts 11 and disks 9'' in normal position. The outwardly projecting ends of the levers 6' have eyes formed therein for attachment of the ends of a short piece of rope 5, which rope is passed through eyes in oppositely projecting arms 13 carried by the harp. A ring 14 is shown placed upon the bight of the rope 5 to which the trolley rope 12 is secured. When the rope 12 is pulled upon the disks 9'' will both be swung rearwardly to allow the trolley to be lowered away from the wire 28.

In the form of the invention shown in Fig. 8 the horizontal motion arm 20 is pivoted upon pivot 21 between the bifurcated ends of a lever 22 carried by the trolley support. The ends of the bifurcations of arm 22 are extended to the rear and turned at an angle to provide lugs 26, through an eye in each of which lugs a bolt 30 may be passed and may be secured therein by nuts 31. Trolley supporting springs 25 are secured to the eye-bolts and to the extension of the trolley pole 19 beyond its pivot in the usual manner.

Having thus described my invention what I claim as new and desire to secure by Letters Patent is:

1. A trolley comprising in combination, a harp having side pieces, a trolley wheel revolubly mounted in said side pieces, a vertical shaft journaled on each side piece, inwardly projecting members carried by said shafts, said members closing the space above the trolley wheel, and resiliently yielding means to keep said members in normal position.

2. A trolley comprising in combination, a harp having side pieces, a trolley wheel revolubly mounted in said harp, a vertical shaft journaled on each side piece, inwardly projecting members carried by said shafts, said members overlapping each other and the trolley wheel, resilient yielding means to keep said members in normal position, and means to keep said harp in a substantially vertical position during changes of trolley pole angle.

3. A trolley comprising in combination, a harp having side pieces, a trolley wheel revolubly mounted in said harp, a vertical shaft journaled on each side piece, inwardly projecting members carried by said shafts and closing the space above the wheel, a spring extending transversely of said harp and connected to said shafts to resist rotation thereof.

4. A trolley comprising in combination, a harp having side pieces, a trolley wheel revolubly mounted in said harp, a vertical shaft journaled on each side piece, inwardly projecting members carried by said shafts and closing the space above the wheel, a spring extending transversely of said harp and connected to said shafts to resist rotation thereof, and means operable by a trolley rope to revolve said shafts against the resistance of said spring to move said members for passage of a trolley wire.

5. A trolley comprising in combination, a harp having side pieces, a trolley wheel revolubly mounted in said harp, a vertical shaft journaled on each side piece, inwardly projecting members carried by said shafts, said members having portions of reduced thickness providing shoulders adjacent the respective shafts, said shoulders reversely disposed and the reduced portions normally overlapping whereby to close the space above said trolley wheel, resiliently yielding means to hold said members in normal position.

6. A trolley comprising in combination, a harp having side pieces, a trolley wheel revolubly mounted in said harp, a vertical shaft journaled on each side piece, inwardly projecting members carried by said shafts, said members having portions of reduced thickness providing shoulders adjacent the respective shafts, said shoulders reversely disposed and the reduced portions normally overlapping whereby to close the space above said trolley wheel, resilient yielding means to hold said members in normal position, and means operable by the trolley rope to revolve said shafts against the resistance of said resilient means to swing said members for passage of a trolley wire.

In testimony whereof I affix my signature.

MANUEL D. DOMINGUEZ.